UNITED STATES PATENT OFFICE.

DESMOND GERALD FITZ-GERALD, OF LONDON, ENGLAND.

METHOD OF PRODUCING ELECTRODES.

SPECIFICATION forming part of Letters Patent No. 524,710, dated August 21, 1894.

Application filed November 7, 1893. Serial No. 490,281. (No specimens.)

*To all whom it may concern:*

Be it known that I, DESMOND GERALD FITZ-GERALD, electrician, of No. 94 Loughborough Road, London, S. W., England, have invented new and useful Improvements in the Manufacture of Elements or Electrodes for Voltaic Batteries and Electrolytic Decomposition-Cells, of which the following is a full, clear, and exact description.

My invention relates to an improved method of producing elements or electrodes for voltaic batteries and electrolytic decomposition cells from an oxide of lead, or a mixture of different oxides of lead, by causing the moistened lead oxide or oxides to "set" so as to be no longer liable to become disintegrated when immersed in an aqueous liquid as is necessary in the subsequent operation of converting the set material into dense, hard and coherent peroxide of lead or spongy lead as the case may be. It has heretofore been proposed to bring about this setting of moist lead oxide by the action of a salt such as sulphate of ammonia or sulphate of lead.

It is the object of my present invention to obtain a better result than can be obtained by the use of either of the above mentioned salts, the superiority of the present method being due to the fact that the set product is more homogeneous and more porous and at the same time is stronger and especially that it is capable of being "formed" or converted into peroxide of lead in a very much shorter time and with a very much smaller expenditure of electrical energy than has hitherto been necessary when the product has been caused to "set" by means of any salt heretofore used.

My present invention consists essentially in the treatment of the monoxide of lead (litharge or massicot) or of minium (or of a mixture of these oxides with one another or with peroxide of lead) by caustic fixed alkali in the presence of water, thereby forming some alkaline plumbite in the mass, and in the subsequent exposure of the molded mass to an atmosphere containing carbonic acid whereby the alkaline plumbite is decomposed with the formation of an alkaline carbonate and precipitation of an oxide of lead. This chemical reaction within the mass has the effect of causing the setting of the entire mass of lead oxide so as to obviate its subsequent disintegration when immersed in an aqueous solution.

The molded mass after having "set" as above described may advantageously be treated (by immersion or otherwise) with a solution of a sulphate salt, preferably sulphate of magnesia, the treatment being preferably repeated, after intervals for drying, one or more times for successively longer periods. The effect of this treatment is to form some sulphate of lead in the "set" mass which tends to harden it. A further effect of the treatment is to dissolve the alkali (both caustic and carbonated) out of the mass and cause it to simultaneously combine with sulphuric acid while the carbonic acid combines with the base of the sulphate salt, so that the operation is unattended by the violent evolution of carbonic acid (and consequent tendency to disintegration of the mass) which would occur were the set plate to be immersed in dilute sulphuric acid without the previous removal of the carbonated alkali. The molded masses of the material so prepared may then be respectively peroxidized and reduced to spongy lead by electrolytic action in the ordinary way.

The following are examples of the modes in which I prefer to carry my invention into effect:

A.—I mix litharge or massicot or minium, or a mixture of them, with a solution of caustic potash (or with a mixed solution of caustic potash and caustic soda) having preferably a specific gravity of from 1,100° to 1,150°. Caustic soda alone might be used, but is undesirable by reason of the subsequent efflorescence of the sodic carbonate formed.

If used in admixture with caustic potash the latter should be in the larger proportion, to avoid excessive efflorescence. The quantity of solution used should be sufficient to form the lead oxide or oxides into a stiff paste which is then molded in the ordinary way into plates or into masses of any other desired form, under a degree of pressure which need not exceed that obtainable with an ordinary hand screw press. Such plates or masses may have any suitable conductor embedded in them in the process of molding, or a suitable conductor may be subsequently attached to the molded plates or masses. The molded plates or masses are then exposed to an atmosphere containing carbonic acid (preferably to a current of air containing the full normal or an increased percentage of carbonic acid) for a sufficient period to convert a considerable percentage of the alkali into carbonated alkali.

Experience with ordinary air has shown that an exposure for three days is sufficient, but when convenient this period of exposure may advantageously be extended. The effect of this exposure is partially to dry the plates or other masses and by the conversion of the caustic into carbonated alkali, to precipitate the oxide of lead previously held in solution. When such precipitation has occurred to a sufficient extent, the material "sets" and will no longer disintegrate when immersed in an aqueous fluid. The set plates or masses are then dipped for a few seconds in a solution of sulphate of magnesia which may be half-saturated or more dilute. This dipping should be at least twice repeated at intervals of a day or more and be dried by exposure to air after each immersion. The sulphate solution used for the last immersion should be more dilute than the preceding solutions and should be slightly acidulated with sulphuric acid and the plates may advantageously be left for some hours in this acidulated solution with a view to dissolve out precipitated magnesium hydrate. The plates or masses should afterward be stood in a rack to drain and dry, and become "seasoned." The plates or masses may be reduced to spongy lead or peroxidized by the ordinary means.

B.—A modification of the above process adapted for the production of plates of greater porosity, is to subject litharge or massicot or minium, or a mixture of them, preferably in a slightly damp condition, to pressure in a mold between sheets of a material, such as linen or felt, containing enough moisture to cause the surface particles of the lead oxide or oxides to cohere sufficiently to allow of the subsequent treatment of the molded mass (either within the mold or otherwise supported, as by a plate of glass) with an alkaline solution such as is above specified, the treatment in this case being conveniently effected by gently pouring a sufficient quantity of the caustic solution over the molded mass. The subsequent steps in this process—i. e. exposure to carbonic acid and treatment with sulphate solution—are similar to those above described.

C.—In a third process, a mixture of any one or more of the lower oxides of lead with peroxide of lead is used which may contain twenty-five per cent. or more of the latter ingredient. The mixture may either be made into a paste with the caustic solution or be molded dry and moistened with the caustic solution as in the methods above mentioned. In this case the treatment with the alkaline solution causes the plate or mass to quickly set into a hard porous condition, even without the intervention of carbonic acid, so that exposure to that gas for a longer period than a few hours and subsequent treatment with sulphate of magnesia are not in this case essential.

It is to be observed that the proportion of peroxide contained in the mixture to be treated may be such that the process becomes practically one for the utilization of peroxide of lead, whether produced chemically or electrolytically. I prefer, however, that the proportion of the lower oxide present should not be less than, say, ten per cent. or thereabout, in order to produce with certainty the "setting" effect desired.

The plate or mass being initially conductive is, for this reason as well as from the fact that it may be regarded as partly "formed," rapidly convertible wholly into peroxide by the passage of the current.

I would observe that I have given the above processes as examples of the mode in which I usually carry my invention into effect, but I do not limit myself thereto.

I claim—

1. The herein described process of manufacturing battery-electrodes which consists in treating one or more of the lower oxides of lead with an alkaline hydrate, converting the caustic alkali into carbonated alkali by exposure to carbonic acid, and treating the resulting mass with a solution of sulphate of magnesia, as specified.

2. The herein described process of manufacturing battery-electrodes which consists in treating litharge with a solution of caustic potash, converting the caustic alkali into carbonated alkali by exposure to carbonic acid, and treating the resulting mass with sulphate of magnesia, as specified.

3. The herein described process of manufacture of battery plates which consists in treating a mixture of litharge and minium with a mixture of caustic potash and caustic soda in solution, converting the caustic alkali into carbonated alkali by exposure to carbonic acid, and treating the resulting mass with sulphate of magnesia, as specified.

Signed by the said DESMOND GERALD FITZ-GERALD.

DESMOND GERALD FITZ-GERALD.

In presence of—
  G. F. WARREN,
    *Notary Public, London.*
  THOMAS LAKE,
    *17 Gracechurch Street, London.*